United States Patent [19]

Isakson et al.

[11] 4,207,564

[45] Jun. 10, 1980

[54] PISTON OVERTRAVEL INDICATOR

[75] Inventors: Larry E. Isakson; Dennis M. Stanuszek, both of Owosso, Mich.

[73] Assignee: Midland-Ross Corporation, Cleveland, Ohio

[21] Appl. No.: 914,382

[22] Filed: Jun. 12, 1978

[51] Int. Cl.[2] ........................ G08B 21/00; B60Q 1/26; H01H 35/38

[52] U.S. Cl. ............................ 340/626; 33/DIG. 15; 92/5 R; 116/272; 116/280; 137/806; 200/82 D; 340/52 C

[58] Field of Search ...................... 340/605, 52 C, 626; 200/82 R, 82 C, 252-261, 82 D; 92/5 R; 137/806; 33/DIG. 15; 73/308, 313, 319, 321, 322; 116/272, 280

[56] References Cited

U.S. PATENT DOCUMENTS

| | | | |
|---|---|---|---|
| 3,542,438 | 11/1970 | Falk | 340/52 C X |
| 3,602,883 | 8/1971 | Belart | 340/52 C |
| 3,708,211 | 1/1973 | Bueler | 340/52 C X |
| 3,810,142 | 5/1974 | Ito | 340/605 |
| 3,997,887 | 12/1976 | Poynter | 340/626 |

*Primary Examiner*—John W. Caldwell, Sr.
*Assistant Examiner*—Daniel Myer
*Attorney, Agent, or Firm*—H. Duane Switzer

[57] ABSTRACT

A piston overtravel indicator for indicating overtravel of a piston from a rest position adjacent one end of a cylinder to working positions displaced from the rest position toward the other end of the cylinder. The indicator includes an elongated indicator rod slidably extending through a hole in the other end of the cylinder and having an inner rod end located within the cylinder adjacent the working positions of the piston. Overtravel of the piston beyond working positions causes engagement of same with the inner rod end for moving the rod outwardly through the hole. The indicator rod has a circumferential groove adjacent the inner end thereof for cooperation with a yieldable abutment extending into the hole for preventing complete outward displacement of the indicator rod through the hole.

7 Claims, 2 Drawing Figures

PISTON OVERTRAVEL INDICATOR

BACKGROUND OF THE INVENTION

This application pertains to the art of indicators and, more particularly, to indicators for indicating overtravel of a piston in a cylinder. The invention is particularly applicable for use in a pressure converter for converting pneumatic pressure to hydraulic pressure, and will be particularly described with reference thereto. However, it will be appreciated that the invention has broader aspects and may be used in other devices having pistons which may overtravel.

This application relates generally to a piston overtravel indicator of the type disclosed in U.S. Pat. No. 3,997,887 issued Dec. 14, 1976, to Poynter. In the arrangement of the Poynter patent, an elongated indicator rod extends through a hole in an end wall of a pneumatic cylinder. Overtravel of the pneumatic piston beyond its normal working positions causes same to engage the inner end of the indicator rod for pushing same outwardly. A switch cooperating with the indicator rod is closed by axial outward movement of the indicator rod for energizing an audible or visual signal.

In the arrangement of the Poynter patent, the indicator rod is held against complete outward displacement from the cylinder by a snap ring received in a circumferential groove adjacent the inner end of the indicator rod. The snap ring extends radially outwardly of the indicator rod a distance greater than the diameter of the hole through which the indicator rod slides. The snap ring will engage the inner surface of a cylinder end wall for preventing complete outward displacement of the indicator rod. This arrangement makes it impossible to completely remove the indicator rod without completely disassembling the entire pneumatic cylinder. The arrangement of Poynter with the snap ring also requires assembly of the indicator rod and snap ring prior to assembly of the other cylinder parts because the inner end portion of the indicator rod is not accessible once the cylinder is assembled. The use of a snap ring requires additional assembly and it would be desirable to simplify the arrangement for preventing complete outward displacement of the indicator rod.

It is a principal object of the present invention to provide an improved indicator for indicating overtravel of a piston.

It is also an object of the invention to provide an improved integral stop means for preventing complete outward displacement of an indicator rod.

It is a further object of the invention to provide an improved indicator rod having a stop for preventing complete outward displacement thereof, while permitting assembly of the indicator rod subsequent to assembly of the complete cylinder.

It is an additional object of the invention to provide an improved indicator rod which may be removed and replaced without disassembly of the entire cylinder on which it is mounted.

DESCRIPTION OF A PREFERRED EMBODIMENT

Figure 1:
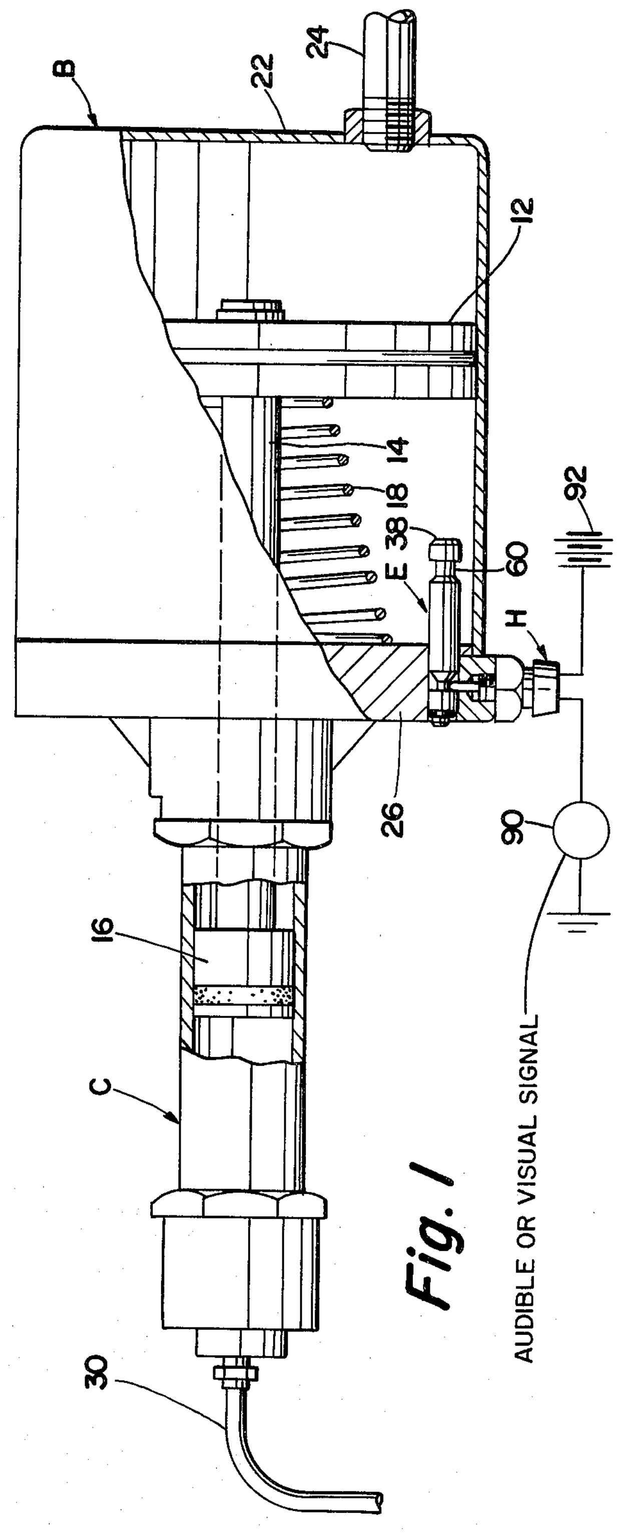
FIG. 1 is a side elevational view of a pressure converter having the improved indicator of the present application incorporated therein, and with portions cut-away and in section for clarity of illustration.
Figure 2:
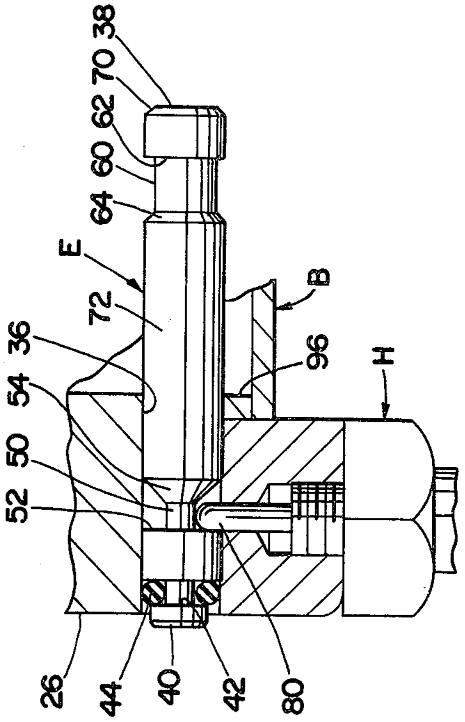
FIG. 2 is an enlarged cross-sectional elevational view of the improved indicator assembly.

With reference to the drawing, FIG. 1 shows a pressure converter including a pneumatic cylinder B connected in tandem with a hydraulic cylinder C. A pneumatic piston 12 positioned within pneumatic cylinder B is attached to a rod 14 having a hydraulic piston 16 attached thereto within hydraulic cylinder C. A coil spring 18 acts against piston 12 for normally urging same to the right in FIG. 1 to a rest position adjacent one cylinder end wall 22. Air pressure supplied to cylinder B through supply conduit 24 moves piston 12 from its rest position adjacent one cylinder end wall 22 toward other cylinder end wall 26. Movement of pneumatic piston 12 to the left also causes movement of hydraulic piston 16 to the left for developing hydraulic pressure through hydraulic cylinder outlet conduit 30 for operating various hydraulic devices.

During normal operation of the apparatus, pneumatic piston 12 will never move beyond its normal working position which may be around halfway between end walls 22 and 26. However, in the event of a failure in one of the hydraulic devices or the need for adjustment thereof, pneumatic piston 12 will overtravel beyond its normal working positions and move closer toward other cylinder end wall 26. When overtravel of piston 12 occurs, it is desirable to warn the operator of the equipment that a failure is imminent or has occurred. Therefore, a piston overtravel indicator is provided for engagement by piston 12 upon overtravel thereof to energize an indicator.

Other cylinder end wall 26 has a hole 36 therethrough extending parallel to the direction of movement of piston 12. An elongated cylindrical indicator rod E is slidably received in hole 36. Indicator rod E has an inner end 38 and an opposite outer end 40. A circumferential seal receiving groove 42 is provided in indicator rod E adjacent outer end 40 thereof for receiving an O-ring 44 which sealingly engages the wall of hole 36 for preventing entry of dirt into cylinder B and hole 36 to maintain reliable operation of the indicator and cylinder.

An outer circumferential groove 50 is provided in the outer periphery of indicator rod E adjacent outer rod end 40 and spaced somewhat further therefrom than seal receiving groove 42. Outer circumferential groove 50 has one groove sidewall 52 which extends substantially radially of the longitudinal axis of indicator rod E. Radial groove sidewall 52 is on the side of outer groove 50 located closest to outer rod end 40. An opposite sloping groove sidewall 54 lies generally on the surface of a cone and slopes outwardly from the bottom of outer groove 50 in a direction toward indicator rod inner end 38.

An inner circumferential groove 60 is provided in the outer periphery of indicator rod E adjacent inner rod end 38. Inner groove 60 includes a radial groove sidewall 62 which extends substantially radially of the longitudinal axis of indicator rod E. Radial groove sidewall 62 is located on the side of groove 60 closest to inner rod end 38. An opposite inner groove sidewall 64 defines a sloping groove sidewall which lies on the surface of a cone and slopes outwardly from the bottom of inner groove 60 toward outer rod end 40.

The inner end portion of indicator rod E adjacent inner rod end 38 is chamferred as indicated at 70 to slope in the same direction as sloping groove sidewall 64. Indicator rod E includes a cylindrical central portion 72 extending between circumferential grooves 50 and 60. Sloping groove sidewalls 54 and 64 also define opposite sloping end walls of central rod portion 72. These central portion sidewalls slope in opposite directions from central portion 72 toward the longitudinal axis of rod E and toward the ends thereof.

A normally open electrical switch assembly H is mounted to cylinder B and has a switch plunger 80 extending inwardly of indicator rod hole 36 for engagement with indicator rod E. Switch plunger 80 is yieldably biased in a direction to enter indicator rod hole 36 laterally thereof and define a yielding abutment means.

Indicator rod E may be inserted into hole 36 from the exterior of cylinder B by inserting inner rod end 38 into hole 36 from outside of other cylinder end wall 26. Indicator rod E may be so inserted through hole 36 before assembly of switch H to cylinder B. However, insertion of indicator rod E through hole 36 may also be accomplished with switch H in assembled position because chamfer 70 and sloping groove sidewall 64 act as cam surfaces to cam plunger 80 outwardly of hole 36 for allowing rod E to move axially past plunger 80 until plunger 80 enters outer circumferential groove 50. Plunger 80 will then cooperate with radial groove sidewall 52 for preventing complete movement of indicator rod E into cylinder B.

An audible or visual signal 90 is connected to a voltage source 92 through switch H. Upon overtravel of piston 12 beyond its normal working positions, piston 12 engages inner rod end 38 for moving rod E axially outwardly through hole 36 in other cylinder end wall 26. Sloping groove sidewall 54 of outer circumferential groove 50 acts as a cam for camming plunger 80 outwardly of hole 36 to ride along central rod portion 72. This closes switch H for energizing indicator 90. Inner circumferential groove 60 prevents complete outward displacement of indicator rod E because plunger 80 will enter inner circumferential groove 60 and cooperate with radial groove sidewall 62 for preventing outward movement of rod E past plunger 80. The depth of inner circumferential groove 60 is substantially less than the depth of outer circumferential groove 50 so that entry of switch plunger 80 into inner circumferential groove 60 is not far enough to open switch H so that indicator 90 remains energized. Outer circumferential groove 50 is deep enough to allow plunger 80 to move a sufficient distance for opening switch H. Once the defect which caused piston overtravel is corrected, sloping surface 64 of inner groove 60 acts as a cam for allowing indicator rod E to be pushed back into the position shown with switch plunger 80 received in outer circumferential groove 50.

Inner circumferential groove 60 and radial sidewall 62 thereof define a rod stop means for cooperating with the abutment means defined by plunger 80 to prevent complete outward displacement of indicator rod E upon piston overtravel. However, the depth of groove 60 is such that switch H remains energized when plunger 80 enters same. The abutment means defined by switch plunger 80 is located a predetermined distance from inner surface 96 of other cylinder end wall 26. Radial groove sidewall 62 is spaced from inner rod end 38 a distance not greater than that predetermined distance in order that inner rod end 38 will be flush with inner surface 96 or spaced from inner surface 96 within hole 36 when plunger 80 engages radial groove sidewall 62. In the event of a massive failure, this allows complete overtravel of piston 12 without damaging indicator rod E or switch plunger 80.

In the event indicator rod E is bent or requires replacement for other reasons, it is possible to completely remove same without complete disassembly of cylinder B simply by removing switch assembly H and pulling indicator rod E outwardly. A new indicator rod E can then be inserted through hole 36 in the manner previously described. Arranging the indicator assembly so it is possible to insert indicator rod E through hole 36 with switch assembly H installed provides an automatic locator for the proper position of indicator rod E when a plunger 80 enters groove 50.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

We claim:

1. An indicator for indicating overtravel of a piston comprising: a fluid cylinder having a piston therein movable from a rest position adjacent one cylinder end to working positions displaced from said rest position toward the other cylinder end, a hole through said other cylinder end extending parallel to the direction of movement of said piston, an elongated indicator rod slidably received in said hole, said rod having an inner rod end positioned within said cylinder adjacent said working positions for engagement by said piston upon overtravel of said piston beyond said working positions to move said rod outwardly through said hole, said rod having an outer rod end opposite from said inner rod end, a switch having a yieldable switch plunger extending laterally into said hole for engaging said rod, inner and outer circumferential grooves in the outer periphery of said rod respectively located adjacent said inner and outer rod ends, said switch having open and closed positions and being in one of said positions when said plunger is received in said outer groove and being in the other of said positions when said plunger is received in said inner groove, said outer groove cooperating with said plunger for preventing complete displacement of said rod inwardly through said hole, and said inner groove cooperating with said plunger for preventing complete displacement of said rod outwardly through said hole.

2. The indicator of claim 1 wherein said rod has a cylindrical central portion between said grooves, said central portion having sloping opposite ends which slope gradually inwardly toward the longitudinal axis of said rod to define cam surfaces for biasing said plunger outwardly and providing movement through said hole of that portion of said rod located between said grooves.

3. The indicator of claim 2 wherein said grooves have groove sidewalls opposite from said sloping opposite ends which extend substantially radially of the longitudinal axis of said rod for providing complete displacement of said rod through said other cylinder end only by manually removing said plunger from said grooves.

4. The indicator of claim 3 wherein said inner rod end is smoothly chamfered for providing insertion of said rod into said hole past said plunger.

5. The indicator of claim 1 wherein said other end wall has an inner surface and said plunger is spaced a predetermined distance from said inner surface, said inner groove being spaced a sufficient distance from said inner rod end such that said inner rod end does not project into said cylinder when said plunger is received in said inner groove.

6. The indicator of claim 1 wherein said switch is open when said plunger is received in said outer circumferential groove and is closed when said plunger is received in said inner circumferential groove and when said plunger is engaging the outer surface of said rod between said grooves.

7. The indicator of claim 6 wherein said inner circumferential groove has a depth substantially less than the depth of said outer circumferential groove.

* * * * *